US012801229B2

(12) United States Patent
Wang et al.

(10) Patent No.: US 12,801,229 B2
(45) Date of Patent: Nov. 17, 2026

(54) POINTING DEVICE WITH FLEXIBLE SLEEVE

(71) Applicant: Contour Design Nordic A/S, København (DK)

(72) Inventors: Steven Wang, København (DK); Hanning Lu, København (DK); Changjun Zhao, København (DK); Xiaosen Zhu, København (DK); Chengcai Tan, København (DK); Kim Krahl Larsen, København (DK)

(73) Assignee: Contour Design Nordic A/S, København V (DK)

( * ) Notice: Subject to any disclaimer, the term of this patent is extended or adjusted under 35 U.S.C. 154(b) by 0 days.

(21) Appl. No.: 19/105,861

(22) PCT Filed: Sep. 9, 2022

(86) PCT No.: PCT/CN2022/118044
§ 371 (c)(1),
(2) Date: Feb. 24, 2025

(87) PCT Pub. No.: WO2024/050808
PCT Pub. Date: Mar. 14, 2024

(65) Prior Publication Data
US 2026/0003447 A1 Jan. 1, 2026

(51) Int. Cl.
*G06F 3/0362* (2013.01)
*G06F 3/03* (2006.01)
*G06F 3/0354* (2013.01)

(52) U.S. Cl.
CPC .......... *G06F 3/0362* (2013.01); *G06F 3/0304* (2013.01); *G06F 3/0354* (2013.01)

(58) Field of Classification Search
CPC ..... G06F 3/0362; G06F 3/0304; G06F 3/0354
See application file for complete search history.

(56) References Cited

U.S. PATENT DOCUMENTS 5,270,690 A * 12/1993 Oberg .................. G06F 3/0362 345/184
5,698,976 A * 12/1997 Nakajima .............. G06F 3/046 341/15

(Continued)

OTHER PUBLICATIONS

International Search Report and Written Opinion of International Patent Application No. PCT/CN2022/118044, mailed Feb. 17, 2023 (9 pages).

*Primary Examiner* — Michael J Jansen, II
(74) *Attorney, Agent, or Firm* — Nixon Peabody LLP

(57) ABSTRACT

The present disclosure relates to a pointing device comprising a slider bar including a non-circular support member, a flexible sleeve, and a friction-reducing layer. The non-circular support member is elongated along an axis A1 and includes a flat or convex user interface support surface. The flexible sleeve is disposed around the support member. The flexible sleeve is rotatable about the support member and slidable along the support member along axis A1. A portion of the flexible sleeve is supported by the user interface support surface at any time during use. The portion comprises a user interface surface and a friction-reducing layer adhered to the support member. The friction-reducing layer is configured to reduce friction between the support member and the flexible sleeve. The pointing device further comprises a sensor configured to detect rotational and axial movement of the flexible sleeve relative to the support member.

20 Claims, 5 Drawing Sheets

(56) References Cited

U.S. PATENT DOCUMENTS

| | | | | |
|---|---|---|---|---|
| 5,706,026 | A * | 1/1998 | Kent | G06F 3/03546 345/163 |
| 6,329,023 | B2 * | 12/2001 | Tokisue | G11B 5/10 427/127 |
| 6,337,680 | B1 * | 1/2002 | Hamaji | G06F 3/0312 345/184 |
| 8,184,095 | B2 * | 5/2012 | Pan | G06F 3/0338 345/184 |
| 8,314,771 | B2 * | 11/2012 | Nien | G06F 3/0354 345/157 |
| 8,823,644 | B2 * | 9/2014 | Wang | G06F 3/03548 345/184 |
| 8,830,166 | B2 * | 9/2014 | Nien | G06F 3/0354 345/157 |
| 9,024,873 | B2 * | 5/2015 | Nien | G06F 3/0354 345/157 |
| 10,031,591 | B2 * | 7/2018 | Wang | G06F 3/0338 |
| 10,379,635 | B2 * | 8/2019 | Wang | G06F 3/03548 |
| 10,444,858 | B2 * | 10/2019 | Chung | G06F 3/03543 |
| 11,023,053 | B2 * | 6/2021 | Wang | H03K 17/97 |
| 12,282,616 | B2 * | 4/2025 | Laurenzano | G06F 3/0362 |
| 2001/0018094 | A1 * | 8/2001 | Tokisue | G11B 5/10 427/523 |
| 2011/0037693 | A1 * | 2/2011 | Chiang | G06F 3/0354 345/157 |
| 2011/0134031 | A1 * | 6/2011 | Wang | G06F 3/0304 345/157 |
| 2012/0062458 | A1 * | 3/2012 | Pan | G06F 3/0338 345/157 |
| 2012/0063114 | A1 * | 3/2012 | Pan | G06F 3/0338 361/809 |
| 2012/0162070 | A1 * | 6/2012 | Nien | G06F 3/0354 345/157 |
| 2012/0162071 | A1 * | 6/2012 | Nien | G06F 3/0213 345/157 |
| 2012/0169595 | A1 * | 7/2012 | Nien | G06F 3/0362 345/157 |
| 2013/0033420 | A1 * | 2/2013 | Nien | G06F 3/0354 345/156 |
| 2014/0008115 | A1 * | 1/2014 | Sato | C08J 7/043 174/258 |
| 2015/0363014 | A1 * | 12/2015 | Wang | G06F 3/03548 345/157 |
| 2017/0115751 | A1 * | 4/2017 | Wang | G06F 3/0304 |
| 2018/0032151 | A1 * | 2/2018 | Chung | G06F 3/03544 |
| 2018/0223903 | A1 | 8/2018 | Zhang et al. | |
| 2019/0369746 | A1 * | 12/2019 | Nien | G06F 3/02 |
| 2020/0167008 | A1 * | 5/2020 | Wang | G01R 33/07 |
| 2024/0319805 | A1 * | 9/2024 | Laurenzano | G06F 3/0362 |

* cited by examiner

POINTING DEVICE WITH FLEXIBLE SLEEVE

CROSS-REFERENCE TO RELATED APPLICATIONS

This application is a U.S. National Stage of International Application No. PCT/CN2022/118044, filed Sep. 9, 2022, which is hereby incorporated by reference herein in its entirety.

TECHNICAL FIELD

The present disclosure relates to a pointing device.

BACKGROUND

A pointing device is a device arranged to control the movement of a pointer, i.e. a cursor, on a monitor or display at a computer or similar electronic device.

Pointing devices for computer systems generally work by detecting two-dimensional motion relative to a surface. Such pointing device may include a variety of features, such as "wheels" or buttons, which permit a user of the device to perform system-dependent, and possibly customized, operations. The 2D motion of the pointing device typically translates into the motion of a pointer on a display, which allows for fine control of a Graphical User Interface (GUI). Pointing devices also typically utilize a "point and click" sequence of operations where a cursor, once moved to a desired position, can perform a click operation in response to a user interaction with the pointing device. Examples of known pointing devices are a trackball, a touchpad, a joystick, a computer mouse, etc.

The traditional flat computer mouse, which is gripped with one hand, is well known to cause strain on the arms, back, shoulders, neck, hands, and wrists of users. One of the reasons being the move of the hand, with which the mouse is operated, away from the keyboard and back again. Other movements of the arm, hand, wrist, etc. to control the flat computer mouse are also known to cause problems.

It is thus generally desirable to develop pointing devices, which facilitate avoidance of movements that may cause injuries or strains to the user, and/or which minimize strain on the arms, back, shoulders, neck, hands, and/or wrists of a user.

Further, it is generally desirable to reduce the amount of space necessary to operate a pointing device, while also minimizing the strain on the arm, back, shoulders, neck, hands, or wrists of the user.

Pointing devices designed with ergonomics in mind have been developed over the years and is no "one size fits all" solution; An ergonomic pointing device that works well for one user may not work well for another user. Therefore, it is generally desirable to develop improved ergonomic pointing devices.

SUMMARY

Aspects and embodiments discussed herein are directed to an improved ergonomic slider mouse pointing device with improved functionality. In particular, aspects and embodiments discussed herein are directed to an ergonomic slider mouse pointing device having an improved slider bar that provides a user with improved user functionality and reliable measurement precision. Various other benefits and advantages of the aspects and embodiments discussed herein are further described with reference to the figures.

Disclosed herein are embodiments of a pointing device comprising:

a slider bar comprising:

a non-circular support member elongated along an axis A1 and comprising a flat or convex user interface support surface;

a flexible sleeve disposed around the support member, the flexible sleeve being rotatable about the support member and slidable along the support member along axis A1, a portion of the flexible sleeve being supported by the user interface support surface during normal use, the portion comprising a user interface surface; and a friction-reducing layer adhered to the support member, the friction-reducing layer being configured to reduce friction between the support member and the flexible sleeve;

the pointing device further comprising a sensor configured to detect rotational and axial movement of the flexible sleeve relative to the elongate support member.

The support member is elongated along axis A1 and has a non-circular cross-section in a plane that is substantially perpendicular to the A1 axis. The support member is fixed in place, possibly so as to be able to pivot about a pivot point, in the pointing device and the shape of the support member is configured to allow the flexible sleeve to rotate about and slide along the support member. Thus, the flexible sleeve is able to rotate about the elongate support member in a first direction and slide about the elongate support member in a second direction substantially orthogonal to the first direction. In some embodiments, the maximum length of the support member is between 200 mm and 420 mm, such as between 250 mm and 390 mm, such as between 280 mm and 340 mm. In some embodiments, the maximum length of the flexible sleeve is between 170 mm and 330 mm, such as between 200 mm and 300 mm, such as between 220 mm and 280 mm.

The support member comprises a user interface support surface, which is configured so as to support the part of the flexible sleeve comprising a user interface surface. The user interface support surface is arranged to be substantially upward-facing in the pointing device such that it is accessible to a user.

In some embodiments, the pointing device is configured such that the user interface surface accessible to a user has a length of between 80 mm and 250 mm, such as between 100 mm and 230 mm, such as between 140 mm and 190 mm. In some embodiments, the user interface surface accessible to a user has a width of between 20 mm and 46 mm, such as between 25 mm and 41 mm, such as between 30 mm and 36 mm. In some embodiments, the pointing device further comprises a slider bar cover configured to cover part of the slider bar and to provide a suitable user window within which the user can access at least part of the user interface surface.

The support member may, in a plane that is substantially perpendicular to the A1 axis, have a cross-section that is an open curve, e.g. such that the support member is at least partially hollow, or it may be a closed curve, such that the support member is a closed structure. For example, the cross-section of the support member in a plane that is perpendicular to the A1 axis may be substantially oval, elliptical (with an eccentricity greater than zero as the support member is non-circular), an irregular curve, or stadium shaped.

The cross-section of the support member may be characterized by a maximum width W1 and a maximum height H1. In some embodiments, the cross-section of the support member substantially perpendicularly to the axis A1 has a maximum width W1 and a maximum height H1, which may be defined by mutually perpendicular axes A2 and A3, respectively, where axes A2 and A3 are both perpendicular to axis A1. Axis A2 may be parallel to at least one point on the user interface support surface of the support member. The maximum width W1 may be greater than the maximum height H1. The maximum width W1 of the cross-section of the support member may be between 20 mm and 46 mm, such as between 25 mm and 41 mm, such as between 30 mm and 36 mm. The maximum height H1 of the cross-section of the support member may be between 5 mm and 27 mm, such as between 7 mm and 25 mm, such as between 10 mm and 22 mm.

The flexible sleeve may be made of an elastically deformable material. In some embodiments, the flexible sleeve comprises silicone. The shape of the flexible sleeve conforms at least partially to the support member, and the inner side of the flexible sleeve is at least partially in contact with the support member and/or the friction-reducing layer. The cross-section of the flexible sleeve in a plane that is substantially perpendicular to the axis A1 is substantially a smooth plane curve, such as a smooth irregular plane curve or a smooth regular plane curve, that may be oval, elliptical (with an eccentricity greater than zero), or stadium shaped.

In some embodiments, the cross-section of the flexible sleeve substantially perpendicularly to the axis A1 while disposed on the support member has a maximum width W2 and a maximum height H2, which may be defined by mutually perpendicular axes A2 and A3, respectively, where axes A2 and A3 are both perpendicular to axis A1. Axis A2 may be parallel to at least one point on the user interface support surface of the support member. The maximum width W2 may be greater than the maximum height H2. The maximum width W2 of the cross-section of the flexible sleeve may be between 20 mm and 46 mm, such as between 25 mm and 41 mm, such as between 30 mm and 36 mm. The maximum height H2 of the cross-section of the flexible sleeve may be between 5 mm and 27 mm, such as between 7 mm and 25 mm, such as between 10 mm and 22 mm.

In some embodiments, the maximum height H2 of the cross-section of the flexible sleeve is between 10 mm and 30 mm, such as between 10 mm and 25 mm, such as between 13 mm and 20 mm.

The flexible sleeve presents an inner surface towards the support member and/or the friction-reducing layer, and presents an outer surface away from the support member and/or the friction-reducing layer. The outer surface of the flexible sleeve is thus a surface, which a user of the pointing device will touch and manipulate when using the pointing device. Thus, the pointing device is configured such that at least a portion of the outer surface of the flexible sleeve at any time during use presents to a user as a substantially upward-facing user interface surface. In some embodiments, the inner surface of the flexible sleeve has been provided with a friction-reducing layer or has been treated to lower its friction. In some embodiments, the inner surface of the flexible sleeve has been treated with UV light so as to lower the friction of the inner surface, which will improve the ease with which the user can slide and rotate the flexible sleeve about the support member.

In some embodiments, the thickness of the flexible sleeve is between 0.10 mm and 0.40 mm, such as between 0.15 mm and 0.30 mm, such as between 0.20 mm and 0.28 mm. In some embodiments, the thickness of the flexible sleeve is less than 0.30 mm, such as less than 0.25 mm. Having a thin sleeve will make the sleeve easier to manipulate by a user. The flexible sleeve may comprise a plurality of elongated structures disposed on the outer surface of the flexible sleeve and along the length of the flexible sleeve, the elongated structures being configured to increase the stiffness of the flexible sleeve in the axial direction, i.e. along the axis A1. The elongated structures may additionally be configured to increase the ease with which a user can manipulate the flexible sleeve. The elongated structures may extend substantially from one end of the sleeve to the other end, or they may extend along only a portion of the sleeve. In some embodiments, the elongated structures comprise carbon, such as e.g. carbon fibre.

In some embodiments, the friction-reducing layer comprises a cloth, such as a woven cloth. The friction-reducing layer may comprise PTFE. For example, the friction-reducing layer may comprise a PTFE cloth, such as a woven PTFE cloth. The friction-reducing layer is adhered to the support member such that it is fixed on the support member. In some embodiments, the friction-reducing layer is adhered to the support member using an adhesive. The adhesive used to adhere the friction-reducing layer to the support member may be a glue.

In some embodiments, the non-circular support member comprises a first aperture, and the sensor is an optical sensor accommodated within the support member and configured to detect rotational and axial movement of the flexible sleeve relative to the elongate support member via the first aperture. Alternatively, the sensor may be accommodated outside the support member and configured to detect rotational and axial movement of the flexible sleeve relative to the elongate support member in a manner known in the art. The pointing device may comprise multiple sensors such as multiple optical sensors.

In some embodiments, the friction-reducing layer comprises a second aperture aligned with the first aperture, and the optical sensor is further configured to detect rotational and axial movement of the flexible sleeve relative to the support member via the second aperture. The first, and optionally second, aperture(s) allow the inner optical sensor to detect rotational and/or axial movement of the flexible sleeve in a manner known in the art.

The user interface surface may be substantially rectangular. The width of the substantially rectangular user interface surface, substantially along axis A2, may be smaller than the width of the cross-section of the flexible sleeve 7. In some embodiments, the width of the user interface surface is at least 20 mm, such as at least 25 mm, such as at least 30 mm.

Additional aspects, embodiments, features and advantages will be made apparent from the following detailed description of embodiments and with reference to the accompanying drawings.

BRIEF DESCRIPTION OF THE DRAWINGS

Preferred embodiments will be described in more detail in connection with the appended drawings, where.

DETAILED DESCRIPTION

Figure 1:
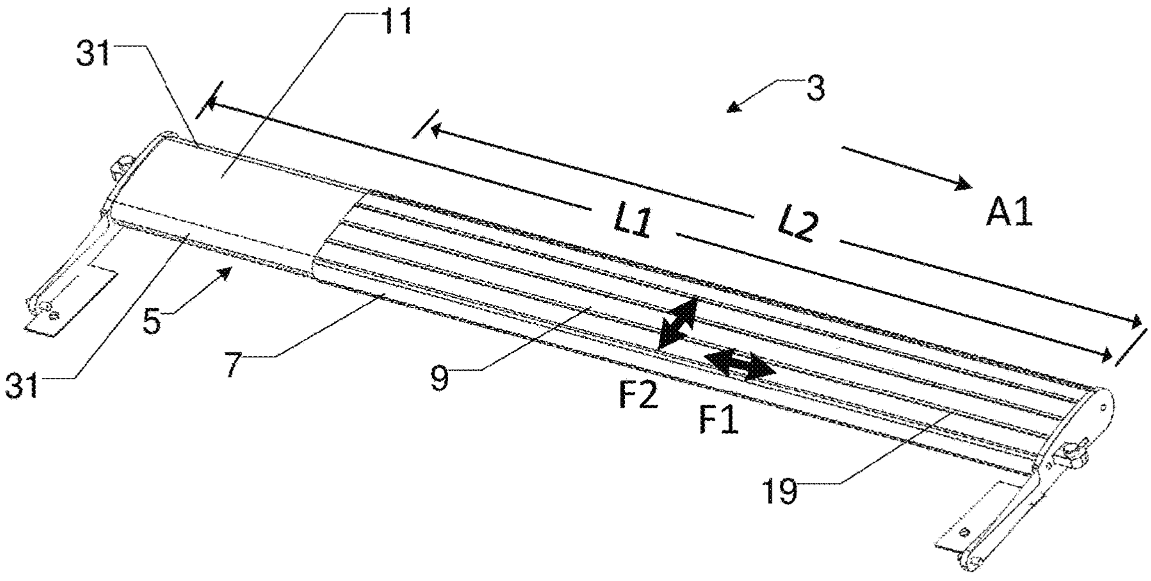
FIG. 1 shows a perspective view of a slider bar according to some embodiments.

FIG. 1 shows a perspective view of a slider bar 3 for a pointing device. The slider bar 3 has a single, rigid support member 5, which is elongated along axis A1. The support member has a flat user interface support surface, which faces substantially upward when the pointing device is positioned on a desk during use. The user interface support surface is configured to support a flexible sleeve 7 thereon and to withstand force being applied to it by a user of the pointing device. The support member 5 may advantageously have a low weight, which reduces the overall weight of the pointing device. For example, the support member 5 may be made of or comprise aluminium, which can provide structural rigidity while being lightweight.

The support member shown in FIG. 1 further has rounded edges 31 extending from two opposing sides of an upward-facing surface of the support member, which comprises the user interface support surface. The rounded edges are configured to facilitate the rotation of the flexible sleeve 7, which is disposed around the support member 5 and which can both rotate around and slide along the support member. The flexible sleeve 7 can thus be moved in two dimensions by a user applying a force to the flexible sleeve 7 causing it to slide and/or rotate on the support member. In a pointing device comprising the slider bar rotation of the flexible sleeve 7 around the support member may move a cursor vertically within a GUI, while an axial movement/translation of the flexible sleeve 7, i.e. sideways movement, may move the cursor horizontally within the GUI.

The flexible sleeve 7 may be quite thin and made of silicone, such as a soft silicone, or a silicone-comprising material. The flexible sleeve may be a unitarily formed silicone tube, i.e. formed as a single tube initially and not as a sheet that is later folded and joined nor as multiple tubes that are later joined. The silicone tube may be made to have a thickness of maximum 0.25 mm. Making the silicone sleeve thin reduces the memory effect of the sleeve, whereby the flexible sleeve can become permanently bent in places, where it is left in a bent position for certain amount of time. Further, the thin silicone sleeve is easier to move around on the support member than a thicker sleeve would be.

A possible downside to such a thin silicone sleeve 7 is a higher susceptibility to breaking. In order to minimize this possible downside, support may be added to the flexible sleeve 7. For example, carbon fibre rods 19 may be added to the outer surface of the silicone tube as support. In the embodiment shown in FIG. 1, carbon fibre rods extend from one end of the flexible sleeve 7 to the other end. These elongated structures in the axial direction of movement, substantially along axis A1, are configured so as to not result in a significant memory effect.

A friction-reducing layer 11 is arranged on the support member 5 and configured to reduce the friction between the flexible sleeve 7 and the support member 5. The friction-reducing layer 11 does not move freely in relation to the rest of the pointing device, but is adhered to the support member. The friction-reducing layer 11 may be a woven cloth of TPFE that is adhered to the support member, for example by gluing the cloth to the support member. The function of the friction-reducing layer 11 is as an intermediate layer between the support member 5 and the flexible sleeve 7 primarily where the two may touch during normal use. The friction-reducing layer 11 may cover substantially at least the user interface support surface 6 of the support member 5 leaving any aperture dedicated to an optical sensor free. For example, the friction-reducing layer 11 may cover substantially the entire support member 5 leaving any aperture dedicated to an optical sensor free. Having the friction-reducing layer 11 between the silicone tube 7 and the support member 5 will further minimize any memory effect on the tube 7.

The flexible sleeve 7 is thus able to move easily on the support member 5 in response to force applied by a user, primarily by force applied by the user's fingers. The user may apply force F1 in the elongate direction, i.e. substantially along axis A1, to cause the flexible sleeve 7 to slide along the length of the support member 5. Additionally, the user may apply force F2 in in a direction substantially perpendicular to axis A1 to rotate the flexible sleeve 7 around the support member 5. The support member 5 acts to support the flexible sleeve 7 such that the inner surface of the flexible sleeve 7 slides on the support member 5 or on the friction-reducing layer 11 that is adhered to the support member 5. To further reduce friction between the flexible sleeve 7 and the surface it moves on, the inner surface of the flexible sleeve may be treated. For example, the inner surface of a silicone tube may be treated with UV light to decrease its friction coefficient. This will increase the ease with which the flexible sleeve moves, when a user manipulates the sleeve.

Within the support member 5 is accommodated an optical sensor, which is configured to detect any rotational movement and/or axial movement of the flexible sleeve 7 relative to the support member 5 via a first aperture in the support member in a manner known in the art. The detection of movement may be based at least in part on a variation of an optical sensor signal received from an inner surface of the flexible sleeve 7 within a field of view of the optical sensor. In one example, the optical sensor provides light to the inner surface of the flexible sleeve 7 and detects light reflected from the inner surface of the sleeve. The flexible sleeve 7 may comprise a pattern on its inner surface that may be printed, adhered, or otherwise formed on the inside surface of the flexible sleeve 7. The pattern may include a colour pattern, a texture pattern, and/or any regular or irregular design on the inside surface. Movement of the flexible sleeve results in a variation in the pattern in the field of view of the optical sensor and in the characteristics of light reflected from the inside surface of the flexible sleeve. In this way, the variation of an optical sensor signal received from an inner surface of the flexible sleeve 7 and detected by the optical sensor may be a variation in the pattern within the field of view as the flexible sleeve moves in relation to the optical sensor. Thus, in order to detect motion of the flexible sleeve 7, an optical sensor system as just described requires that the optical sensor is covered at all times by the inner surface of the flexible sleeve, i.e. that the inner surface of the flexible sleeve is within the field of view of the optical sensor.

In some embodiments, the friction-reducing layer 11 comprises an aperture, a second aperture, which is aligned with the first aperture 15 in the support member such that the friction-reducing layer 11 does not block the field of view of the optical sensor. The optical sensor is then configured to detect rotational and axial movement of the flexible sleeve 7 relative to the support member 5 via both the first and the second aperture.

In some embodiments, the pointing device may comprise multiple optical sensors positioned within the support member and configured to detect the rotational movement and/or axial movement of the flexible sleeve through a plurality of apertures each dedicated to a single sensor, through a common aperture, or a combination thereof. In a device comprising multiple optical sensors the flexible sleeve should then always be covering a respective aperture of at least one optical sensor, but advantageously only one aperture need be covered at any time.

In a device comprising a single optical sensor, the sensor and the aperture through which it detects motion of the sleeve will have to be positioned such that the flexible sleeve always covers the aperture, at least partially. Therefore, the flexible sleeve will have a length of at least slightly more than half the length of the support member. Such a configuration will thus impose a limit to the size of the flexible sleeve and to the range of motion of the flexible sleeve. These limitations may be diminished by using multiple optical sensors, which, together with their respective apertures, are spaced apart along the length of the elongate support member. The flexible sleeve then need only have a length that is long enough to cover at least one of the multiple optical sensors allowing for a reduction in size of the pointing device.

In some embodiments, the pointing device further comprises at least one end sensor capable of detecting movement of the flexible sleeve beyond a predetermined location on the support member. In some embodiments, the pointing device comprises two end sensors positioned at either end of the support member. An end sensor detects when the flexible sleeve has been moved to an end position. For example, an end sensor may be a type of optical sensor configured to detect whether the flexible sleeve covers the end sensor or not in a manner known in the art.

At any time during use, a portion of the flexible sleeve 7 is supported by the user interface support surface of the support member and that portion of the flexible sleeve 7 comprises a user interface surface 9. The user interface surface 9 is part of the outer surface of the flexible sleeve, and is accessible and within easy reach of the user during normal use of the pointing device. As a user moves the flexible sleeve about on the support member, a different area of the outer surface of the flexible sleeve 7 becomes the user interface surface 9.

A length L1 of the support member 5 limits the extent to which the flexible sleeve can slide along the support member. The length L2 of the flexible sleeve is shorter than the length L1 providing room for the flexible sleeve to slide along the support member. The functionally sensible relative difference in lengths L1 and L2 is dependent on a number of factors such as, for example, the sensitivity of the optical sensor, how far the flexible sleeve should be able to move between its two outermost positions, and other limitations imposed by the optical sensor(s) such as those described above.

The support member 5 shown in the embodiment in FIG. 1 is longer than it is wide, and wider than it is tall, such that it has an elongated planar-like shape with rounded edges 31. This shape provides a substantially rectangular user interface surface 9 with a width in the direction of rotation that is larger than what is possible in pointing devices where the elongated bar is circular. This extended width of the user interface surface in the direction of rotation allows for a different movement pattern of the users arm and hand when using the pointing device and will therefore, for some users, provide a better ergonomic.

In a particular embodiment, the length L1 of the support member 5 is approximately 324 mm, the length L2 of the flexible sleeve 7 is approximately 252 mm, the maximum width W1 of the support member 5 is approximately 33 mm, and the maximum height H1 of the support member is approximately 16 mm.

The pointing device may be further configured to allow the user to perform a “clicking” operation as described below in connection with FIG. 2.

The pointing device comprises a controller, for example in the form of at least one electronic circuit, which is configured to be in communication with the optical sensor and to be capable of transmitting data regarding any detected movement of the flexible sleeve to a computer. The transmitted data may serve as a control signal for controlling a cursor in a GUI and may be transmitted over an appropriate connection such as a wired (e.g. serial, USB, etc.) or a wireless (e.g. Bluetooth) connection. The controller may be positioned within the support member. In addition to data on detected movement of the flexible sleeve as detected by the optical sensor, the controller may also transmit other data detected in the pointing device, such as for instance data concerning a click operation as described below in connection with FIG. 2

Figure 2:
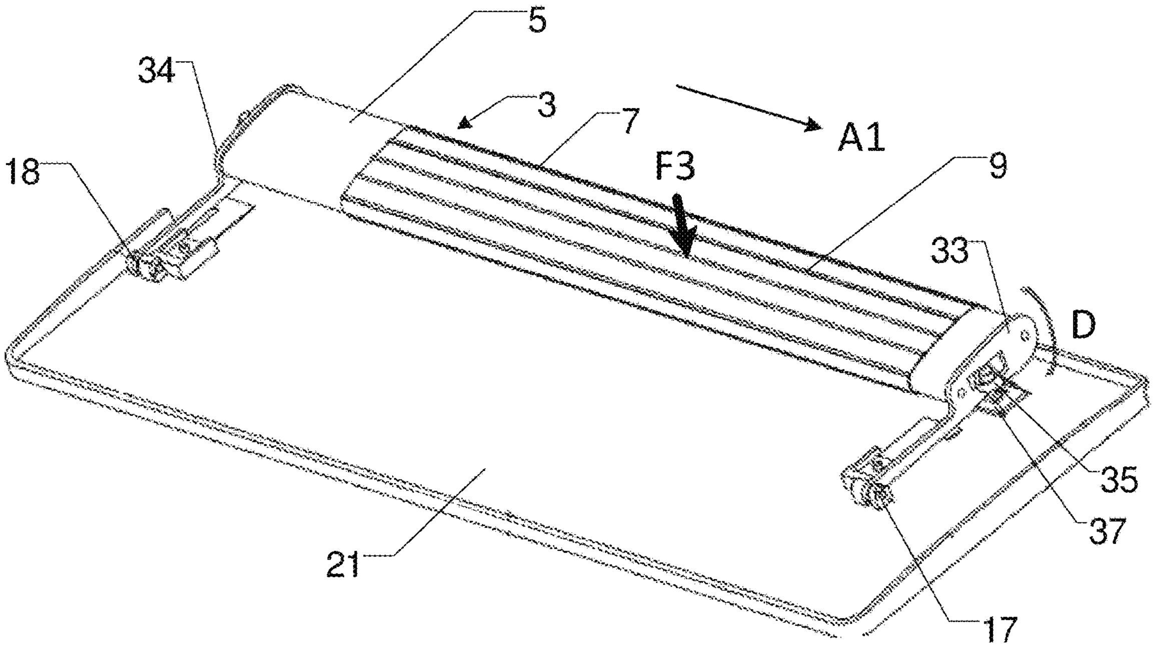
FIG. 2 shows a perspective view of a slider bar mounted on a base member according to some embodiments.

FIG. 2 shows a perspective view of a slider bar 3 mounted on a base member 21 according to some embodiments. The slider bar 3 may be a slider bar as described in connection with FIG. 1.

The pointing devices disclosed herein are intended to be placed on a surface, such as a desk, and between the user and a keyboard. In FIG. 2 is shown a pointing device with a support assembly, which couples the slider bar 3 to a base member 21 and which is configured to suspend the slider bar 3 to permit depression of the slider bar 3 in relation to the base member 21. The base member 21 has a rear-side that is configured to rest on a suitable workspace surface, such as the surface of a desk. FIG. 2 shows a first arm 33 and a second arm 34 disposed at distal ends of the elongate support member 5. Each of the first and second arm 33, 34 is configured to receive the slider bar 3 and to couple the slider bar to a first and second pivot 17, 18, respectively. The first and second pivots 17, 18 are connected to the base member 21. Accordingly, the first and the second arm 33, 34 are configured to pivot about the first pivot 17 and second pivot 18, respectively, in response to a downward pressure being applied to the elongate support member 5 or sleeve 7 relative to the base member 21 of the device. The suspension of the slider bar may be achieved using one or more springs, such as leaf springs, solenoids, etc.

In various embodiments, the first and the second pivot 17, 18 are substantially aligned so as to substantially align rotation of the first and second arm 33, 34 along an axis of rotation. As discussed in further detail herein, such a downward pressure can be used to initiate a click operation.

When a force F3 is applied by the user in a generally downward direction on the slider bar 3, the support assembly allows the slider bar to move downward as illustrated by arrow D. The pointing device comprises a click trigger positioned to be activated in response to the downward pressure applied to the sleeve 7. While in certain examples the click trigger may include a mechanical switch, in various other implementations the click trigger may include a contactless click trigger. The pointing device may comprise a plurality of click triggers.

In FIG. 2 is shown a contactless click trigger comprising a contactless sensor positioned at an end of the elongate support member 5. The contactless sensor shown is a Hall Effect sensor 37 configured to interact with a magnet (or other magnetic source) 35 coupled to the support bar. Downward pressure applied to the flexible sleeve 7 by a user decreases the distance between the Hall Effect sensor and the corresponding magnet. Once a predetermined threshold is reached (i.e., the magnet and Hall Effect sensor reach a predetermined proximity) a click operation is generated. In a particular example, a pointing device may have a first Hall Effect sensor at a first end of the elongate support member 5 and a second Hall Effect sensor at a distal second end of the elongate support member 5. In such an example, a click operation may be generated if the threshold for one of the first Hall Effect sensor and the second Hall Effect sensor is reached, and/or if both of the thresholds are reached.

The amount of pressure desired to generate a click operation may largely depend on user preferences, as well as the corresponding operations performed by the computer in communication with the pointing device. Thus, the pointing device may comprise means to change the force level settings of the click force. Accordingly, in certain examples the pointing device may further comprise a click pressure adjuster configured to adjust the downward pressure that activates the click trigger. The pointing device may further comprise components configured to generate an audible click in response to an activation of the click trigger. As mentioned above in connection with FIG. 1, a controller may transmit data detected in the pointing device, such as for instance data concerning a detected click operation.

The pointing device may further be configured such that the downward force required to activate the click trigger is substantially the same for pressure applied anywhere on the elongate support member 5, or for pressure applied anywhere within the user interface surface 6. A firmware algorithm may achieve such a configuration.

Figure 3A:
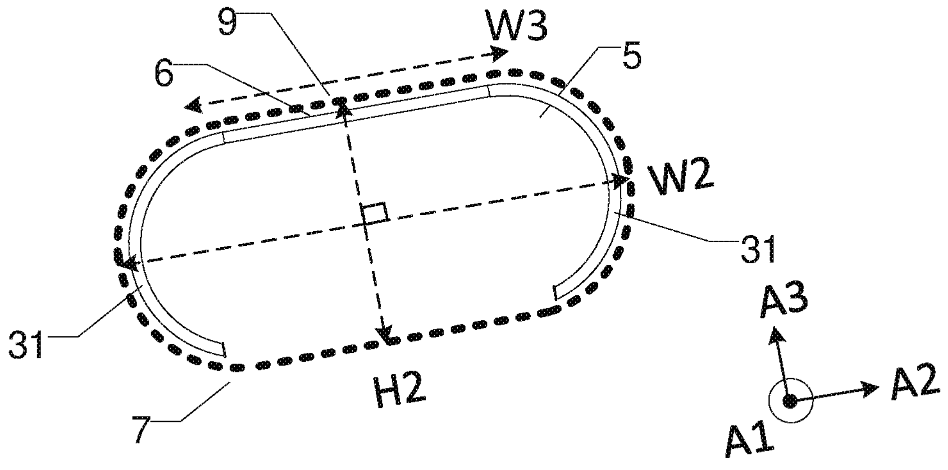
FIG. 3A illustrates a cross-section of a flexible sleeve disposed on a support member according to some embodiments.

FIG. 3A illustrates a cross-section of a flexible sleeve 7 disposed on a support member 5 according to some embodiments. The cross-section has been made in a plane that is substantially perpendicular to the axis A1 along which the support member is elongated.

The support member 5 has a flat user interface support surface 6, which faces substantially upward when the pointing device is positioned on a desk during use. The support member shown in FIG. 3A further has rounded edges 31 extending from two opposing sides of an upward-facing surface of the support member, which comprises the user interface support surface 6. The rounded edges are configured to facilitate the rotation of the flexible sleeve 7, which is disposed around the support member 5. The support member 5 and the flexible sleeve 7 may be those described in connection with FIG. 1.

The support member 5 shown in FIG. 3A is at least partially hollow and the flexible sleeve 7 is shown to be guided in its rotation on the support member 5 by the rounded edges 31.

At any time during use, a portion of the flexible sleeve 7 can be seen to be supported by the user interface support surface 6. That portion of the flexible sleeve 7 comprises the user interface surface 9, which is the surface accessible to the user during normal use of the pointing device. As a user moves the flexible sleeve about on the support member, a different area of the outer surface of the flexible sleeve 7 becomes the user interface surface 9. As the user interface surface 9 is supported by the user interface support surface 6, the flexible sleeve conforms, at least partially, to the shape of the support member 5.

In some embodiments, the shape of the flexible sleeve 7 while disposed on the support member 5 may be characterized by a width W2, along axis A2, and height H2, along axis A3, such as for the stadium-shape shown in FIG. 3A. Axes A2 and A3 are mutually perpendicular and extend in a plane perpendicularly to axis A1. The width W2 is larger than the height H2 and the slider bar 3 is suitable for use in a pointing device in which an extended width of the substantially rectangular user interface surface 9 is desired compared to that achievable using a circular support bar. If a circular support bar is used, a larger diameter of the support bar will, of course, provide a larger the surface for the user to get in contact with, but this is at the expense of the total construction height of the pointing device becoming larger. Generally, in order to provide good ergonomics, a pointing device of the type described herein should be as thin as possible, which would be made increasingly difficult, the larger the diameter of a circular support bar.

The width W3 of the substantially rectangular user interface surface 9 is smaller than the width W2 of the cross-section of the flexible sleeve 7. In some embodiments, the width W3 of the user interface surface 9 is at least 20 mm, such as at least 25 mm, such as at least 30 mm. An extended width of the user interface surface 9 provides a user with an extended area of interaction with the pointing device.

Figure 3B:
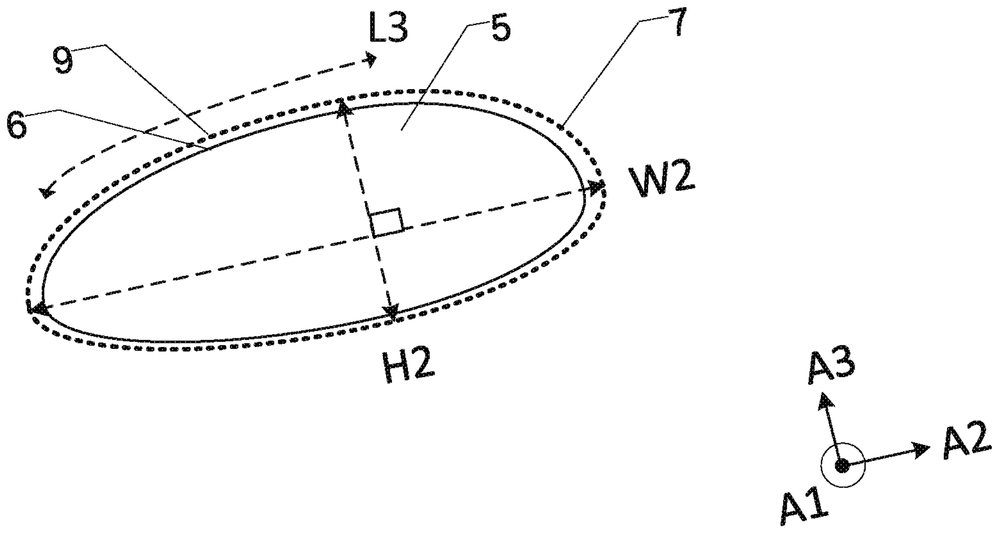
FIG. 3B illustrates a cross-section of a flexible sleeve disposed on a support member according to some embodiments.

FIG. 3B illustrates a cross-section of a flexible sleeve 7 disposed on a support member 5 according to some embodiments. The cross-section has been made in a plane that is substantially perpendicular to the axis A1 along which the support member is elongated.

The cross-section of the support member 5 shown in FIG. 3B is a closed, irregular curve. In other embodiments, the cross-section of the support member 5 substantially perpendicularly to the axis A1 may have another shape, such as e.g. a stadium shape, an oval, or an ellipse (with an eccentricity greater than zero as the support member is non-circular in order to provide a user interface surface 9 with a width in the direction of rotation that is comparatively extended).

The user interface support surface 6 is slightly curved and therefore, so is the user interface surface 9, which conforms, at least partially, to the shape of the user interface support surface 6. A maximum width W2 and maximum height H2 may, for some irregular shapes such as the one illustrated in FIG. 3B, at least partially, characterize the shape of the cross-section of the flexible sleeve 7. However, unlike the embodiment shown in FIG. 3A, which has a flat user interface support surface 6, the width of the user interface surface is not a straight line. Instead, the width of the user interface surface 9 is characterised by the curved length L3, which, naturally, for a small curvature of the user interface support surface approximates a straight line.

Figure 4:
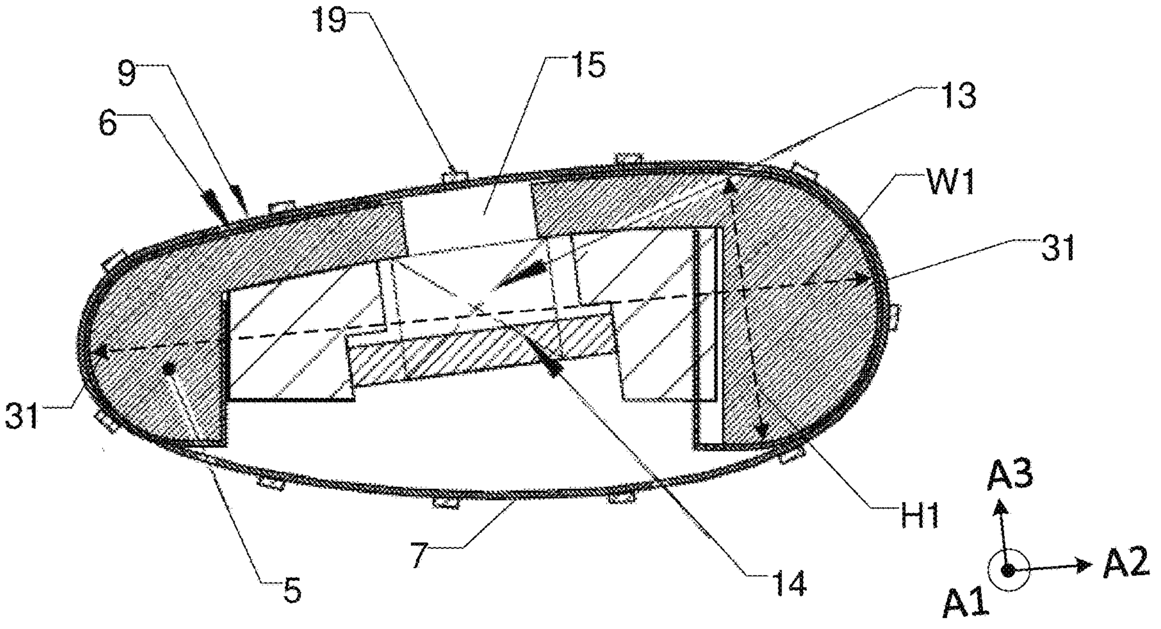
FIG. 4 illustrates a cross-section of a slider bar 3 according to some embodiments.

FIG. 4 illustrates a cross-section of a slider bar 3 according to some embodiments. The cross-section has been made in a plane that is substantially perpendicular to the axis A1 along which the support member is elongated. The support member 5 and flexible sleeve 7 may be a support member and flexible sleeve as described in FIG. 3A.

Within the support member 5 is accommodated an optical sensor 13, which is configured to detect any rotational movement and/or axial movement of the flexible sleeve 7 relative to the support member 5 via a first aperture 15 in the support member in a manner known in the art. The optical sensor 13 is mounted on a PCB 14. The detection of movement may be based at least in part on a variation of an optical sensor signal received from an inner surface of the flexible sleeve 7 within a field of view of the optical sensor. The optical sensor system may be a system as described above in connection with FIG. 1.

The support member 5 is a hollow elongated bar with rounded edges 31 and a generally flat shape. The cross-section of the support member substantially perpendicularly to the axis A1 has a maximum width W1 and a maximum height H1, which are defined by mutually perpendicular axes A2 and A3, respectively, where axes A2 and A3 are both perpendicular to axis A1. Axis A2 is parallel to at least one point on the user interface support surface 6 of the support member 5.

The maximum width W1 is greater than the maximum height H1 such that the support bar 5 extends further in the direction generally parallel to the user interface than in in the direction generally perpendicular to it. The user interface support surface 6 supports the user interface surface 9, which presents to the user as a generally flat, possibly slightly curved, surface.

Figure 5:
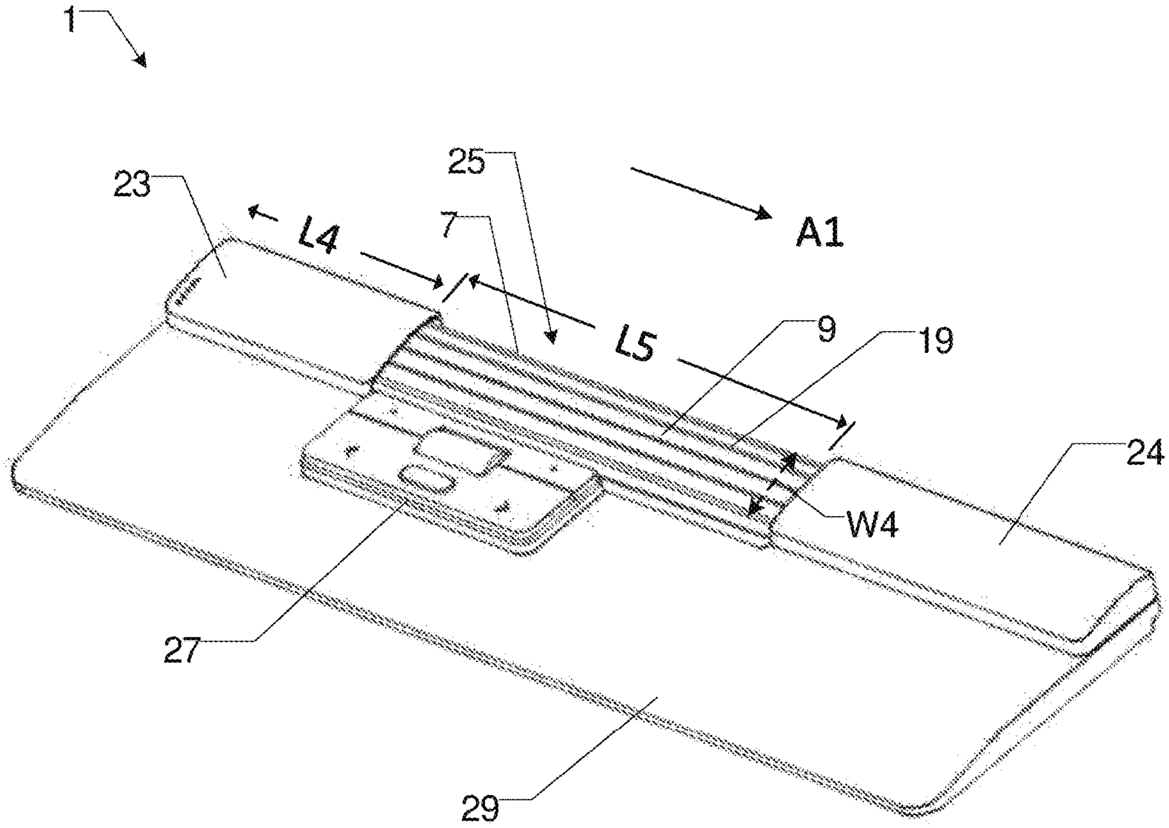
FIGS. 5-7 show a perspective view of a pointing device according to some embodiments.

FIG. 5 shows a perspective view of a pointing device according to some embodiments. The pointing device is intended to be positioned in front of a user, between the user and a keyboard (not shown). The pointing device 1 may comprise a slider bar as described herein. The slider bar is positioned in a casing of the pointing device and such that a substantially upwardly directed surface of the flexible sleeve 7 is available to the user.

The pointing device comprises two end members 23, 24 disposed to each cover an end of the slider bar 3 such that only the flexible sleeve 7, and not the support member, is visible at any time during normal use. Thus, the length L4 of an end member 23, 24 must be at least the length L1 of the support member minus the length L2 of the flexible sleeve 7. This provides a user window 25 enclosing the user interface surface 9 of the sleeve 7 at either end. A user may then, with one or more fingers, reach at least part of the user interface surface 9 and slide or rotate the flexible sleeve 7 relative to the rest of the pointing device 1. In some embodiments, the end members may be part of a single structure, such as a slider bar cover, configured to provide a suitable user window.

In a particular embodiment, the length L1 of the support member 5 is approximately 324 mm, the length L2 of the flexible sleeve 7 is approximately 252 mm, the length L5 of the user window is approximately 166 mm, and the width W3 of the user interface surface 9 is approximately 30 mm.

The point device 1 further comprises a wrist rest support 29, which acts a support for an exchangeable wrist rest. The wrist rest support 29 may comprise one or more attachment members for attaching a wrist rest to the pointing device 1. For example, attachment of a wrist rest may be achieved using magnetism and an attachment member may be a magnet or a metal configured to attach to an appropriate attachment member of the wrist rest.

In a pointing device comprising the slider bar, rotation of the flexible sleeve 7 around the support member may move a cursor vertically within a GUI, while an axial movement/translation of the flexible sleeve 7, i.e. sideways movement, may move the cursor horizontally within the GUI. An advantage of such a pointing device, when positioned correctly, is that a user only has to move the hand a short distance to reach the user interface surface 9, and the response between the movement of the flexible sleeve 7 and the movement of the cursor in a GUI on the monitor is as direct as with a conventional computer mouse.

The pointing device 1 can further comprise a user panel 27 comprising buttons and/or wheels, which may be programmed to correspond with typical operations performed by a conventional mouse. For example, they may permit the user to perform a corresponding function generally performed by a conventional mouse, such as Copy, Paste, Right click, Left click, or Double click. As mentioned above in connection with FIG. 1, a controller may transmit data detected in the pointing device, such as for instance data concerning operations performed using the user panel 27.

Figure 6A:
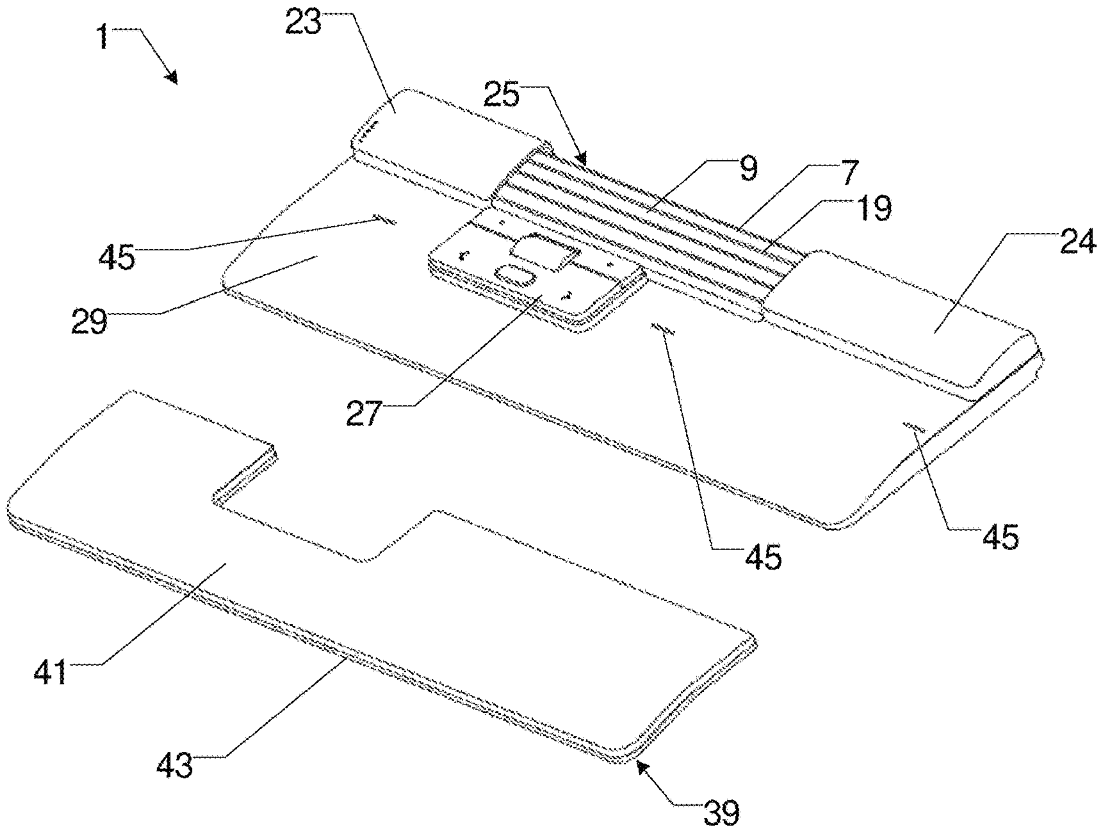
Figure 6B:
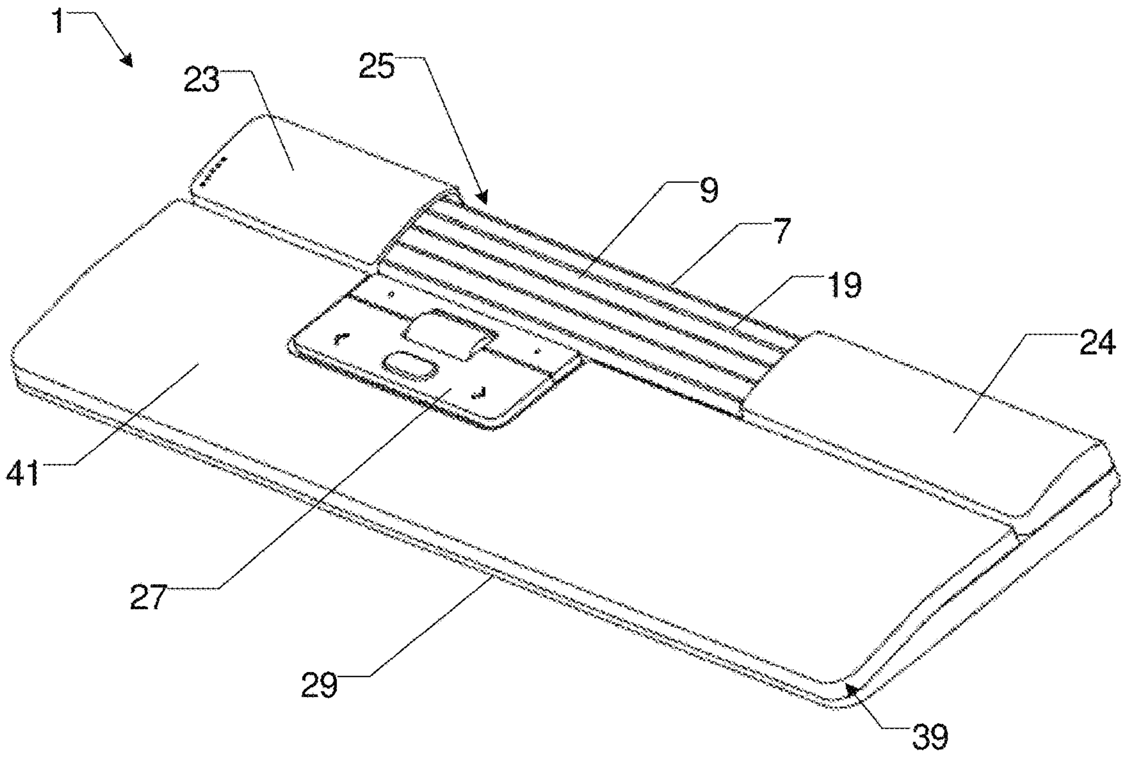

FIGS. 6A and 6B show a perspective view of a pointing device according to some embodiments. The pointing device 1 is intended to be positioned in front of a user, between the user and a keyboard (not shown). The pointing device 1 may be a pointing device as described herein, for example as described in connection with FIG. 5.

The pointing device 1 further comprises a wrist rest support 29, which is configured to support an exchangeable wrist rest 39.

In FIG. 6A is shown a wrist rest support 29 with three attachment members 45 for attaching the wrist rest 39 to the wrist rest support 29. The attachment members 45 on the wrist rest support 29 are configured to attach to appropriate attachment members on the underside of the wrist rest 39 (not shown). For example, the attachment members 45 on the support 29 may each comprise one or more magnets and the attachment members on the wrist rest 39 may be made of a metal, which is magnetisable, or vice versa. In some embodiments, all attachment members, both on the wrist rest support and on the wrist rest comprise one or more magnets.

All attachment members are configured so that a user may easily detach the wrist rest 39 from the wrist rest support 29 e.g. for cleaning or for exchanging of the wrist rest 39.

The exchangeable wrist rest 39 can be configured to at least partially yield when a user places a wrist on the wrist rests. The exchangeable wrist rest may comprise one or more materials, which yield under pressure due to a user placing a wrist on the wrist rest. In some embodiments, the exchangeable wrist rest 39 comprises one or more materials, which yield under pressure due to user's wrists being positioned on the wrist rest and the exchangeable wrist rest 39 further comprises one or more materials, which do not yield under pressure due to user's wrists being positioned on the wrist rest. In some embodiments, the exchangeable wrist rest 39 comprises an upper layer 41 and a lower layer 43, where the lower layer, of the two layers 41, 43, is the layer closest to the wrist rest support 29. The upper and lower layer of the exchangeable wrist rest may be made of different materials and may have different hardness. The lower layer 43 may comprise attachment members configured for attachment to attachment members 45 on the wrist rest. In some embodiments, the lower layer 43 of the wrist rest 39 is configured to rest of the wrist rest support 29. One or more intermediate wrist rest layers may be comprised between the upper 41 and lower layer 43.

In some embodiments, the upper layer 41 is made of an inelastic material, such as a hard polymer or wood. To achieve a wrist rest 39, which yields at least partially so as to provide a more comfortable resting position for the user's wrist when the upper layer 41 is made of an inelastic material, such as wood, the lower layer 43 can be made of an elastic material, such as a silica gel pad. Some users may be more comfortable with the hard upper surface of such a wrist rest when using the pointing device.

In FIG. 6B a wrist rest 39 has been attached to the wrist rest support 29 and provides a resting position for the wrists of a user of the pointing device 1. The wrist rest 39 may be attached to the wrist rest support 29 using attachment members 45 on the wrist rest support 29, which attach to appropriate attachment members on the underside of the wrist rest 39 (not shown) as described above. The attachment members are configured so that a user may easily detach the wrist rest 39 from the wrist rest support 29 e.g. for cleaning or for exchanging of the wrist rest 39.

Figure 7:
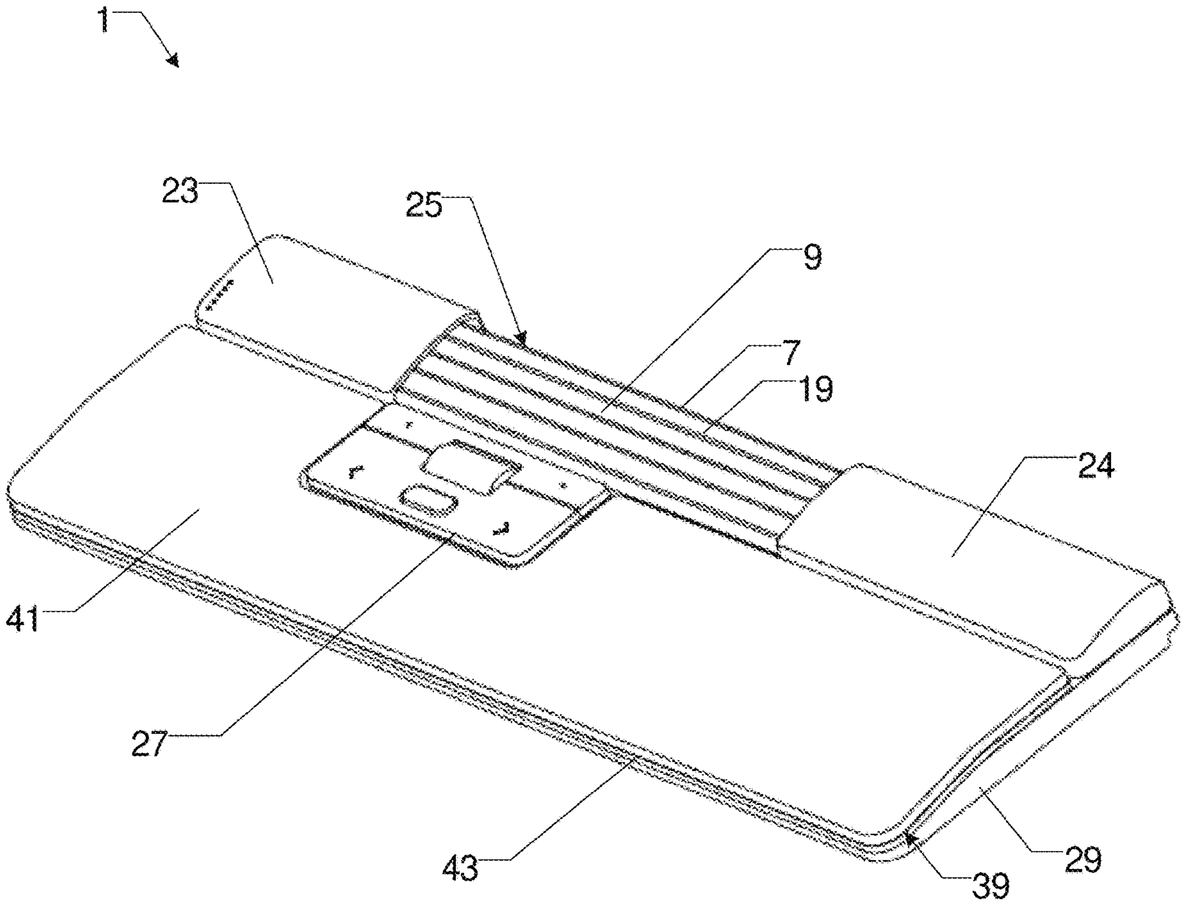

FIG. 7 shows a perspective view of a pointing device according to some embodiments. The pointing device 1 is intended to be positioned in front of a user, between the user and a keyboard (not shown). The pointing device 1 may be a pointing device as described herein, for example as described in connection with FIG. 6A.

In FIG. 7 a wrist rest 39 having an upper layer 41 and a lower layer 43 has been attached to the wrist rest support 29. The wrist rest 39 is configured to provide a resting position for the user of the pointing device 1. As described in connection with FIG. 6A, the upper layer 41 may be made of an inelastic material, such as a hard polymer or wood and the lower layer 43 may be made of an elastic material, such as a silica gel pad. Some users may find it more comfortable to have a wrist rest 39 with a hard upper surface during use of the pointing device.

LIST OF REFERENCES

1 Pointing device
3 Slider bar
5 Support member
6 User interface support surface
7 Flexible sleeve
9 User interface surface
11 Friction-reducing layer
13 Optical sensor
14 Sensor PCB
15 First aperture
17 First pivot
18 Second pivot
19 Elongated structures
21 Base member
23 First end member
24 Second end member
25 User window
27 User panel
29 Wrist rest support
31 Edges
33 First arm
34 Second arm
35 Magnet
37 Magnetic induction sensor
39 Wrist rest
41 Upper layer of wrist rest
43 Lower layer of wrist rest
45 Attachment members on wrist rest support

The invention claimed is:

1. A pointing device, comprising:

a slider bar including a non-circular support member elongated along an axis A1 and comprising a flat or convex user interface support surface;

a flexible sleeve disposed around the support member, the flexible sleeve being rotatable about the support member and slidable along the support member along axis A1, a portion of the flexible sleeve being supported by the user interface support surface during normal use, the portion comprising a user interface surface; and a friction-reducing layer adhered to the support member, the friction-reducing layer being configured to make physical contact with an inner surface of the flexible sleeve and reduce friction between the support member and the flexible sleeve; and a sensor configured to detect rotational and axial movement of the flexible sleeve relative to the elongate support member;

wherein the flexible sleeve comprises a unitarily formed silicone tube, the unitarily formed silicone tube comprising a plurality of elongated structures disposed on the outer surface of the flexible sleeve and along a length of the flexible sleeve, wherein the plurality of elongated structures comprises carbon fibre rods that are configured to increase the stiffness of the flexible sleeve along the axis A1, and wherein the friction-reducing layer is interposed between the unitarily formed silicone tube and the non-circular support member.

2. The pointing device according to claim 1, wherein the support member comprises a first aperture, and wherein the sensor is an optical sensor accommodated within the support member and configured to detect rotational and axial movement of the flexible sleeve relative to the elongate support member via the first aperture.

3. The pointing device according to claim 2, wherein the friction-reducing layer comprises a second aperture aligned with the first aperture, and wherein the optical sensor is further configured to detect rotational and axial movement of the flexible sleeve relative to the support member via the second aperture.

4. The pointing device according to claim 1, wherein the friction-reducing layer is a cloth.

5. The pointing device according to claim 1, wherein the friction-reducing layer comprises PTFE.

6. The pointing device according to claim 1, wherein the cross-section of the flexible sleeve substantially perpendicularly to the axis A1 while disposed on the support member has a maximum width W2 and a maximum height H2 defined by mutually perpendicular axes A2 and A3, respectively, and wherein axes A2 and A3 are both perpendicular to axis A1, and wherein axis A2 is parallel to at least one point on the user interface support surface of the support member, and wherein the maximum width W2 is greater than the maximum height H2.

7. The pointing device according to claim 6, wherein the maximum width W2 of the cross-section of the flexible sleeve is between 20 mm and 42 mm.

8. The pointing device according to claim 7, wherein the maximum height H2 of the cross-section of the flexible sleeve is between 18 mm and 22 mm, and wherein the maximum width W2 of the cross-section of the flexible sleeve is 28 mm and 34 mm.

9. The pointing device according to claim 6, wherein the maximum height H2 of the cross-section of the flexible sleeve is between 13 mm and 27 mm.

10. The pointing device according to claim 1, wherein an inner surface of the flexible sleeve has been treated with UV light so as to lower the friction of the inner surface of the flexible sleeve.

11. The pointing device according to claim 10, wherein the thickness of the flexible sleeve is between 0.20 mm and 0.28 mm.

12. The pointing device according to claim 1, wherein the thickness of the flexible sleeve is between 0.10 mm and 0.40 mm.

13. The pointing device according to claim 1, wherein the maximum length of the support member is between 200 mm and 420 mm.

14. The pointing device according to claim 13, wherein the maximum length of the support member is between 280 mm and 340 mm.

15. The pointing device according to claim 13, wherein the maximum length of the flexible sleeve is between 170 mm and 330 mm.

16. The pointing device according to claim 1, wherein the user interface surface has a length (L5) of between 100 mm and 250 mm, and wherein the user interface surface has a width (W3) of between 23 mm and 35 mm.

17. The pointing device according to claim 16, wherein the user interface surface has a length (L5) of between 150 mm and 190 mm, and wherein the user interface surface has a width (W3) of 27 mm and 31 mm.

18. The pointing device according to claim 1, wherein the support member includes aluminium.

19. The pointing device according to claim 1, wherein the plurality of elongated structures includes carbon fibre rods extending between two ends of the flexible sleeve.

20. The pointing device according to claim 1, wherein the flexible sleeve includes a single uniform silicone tube having a maximum thickness of less than 0.25 mm.

* * * * *